(No Model.)
J. D. CURTIS
BARBED WIRE.
No. 494,326.  Patented Mar. 28, 1893.
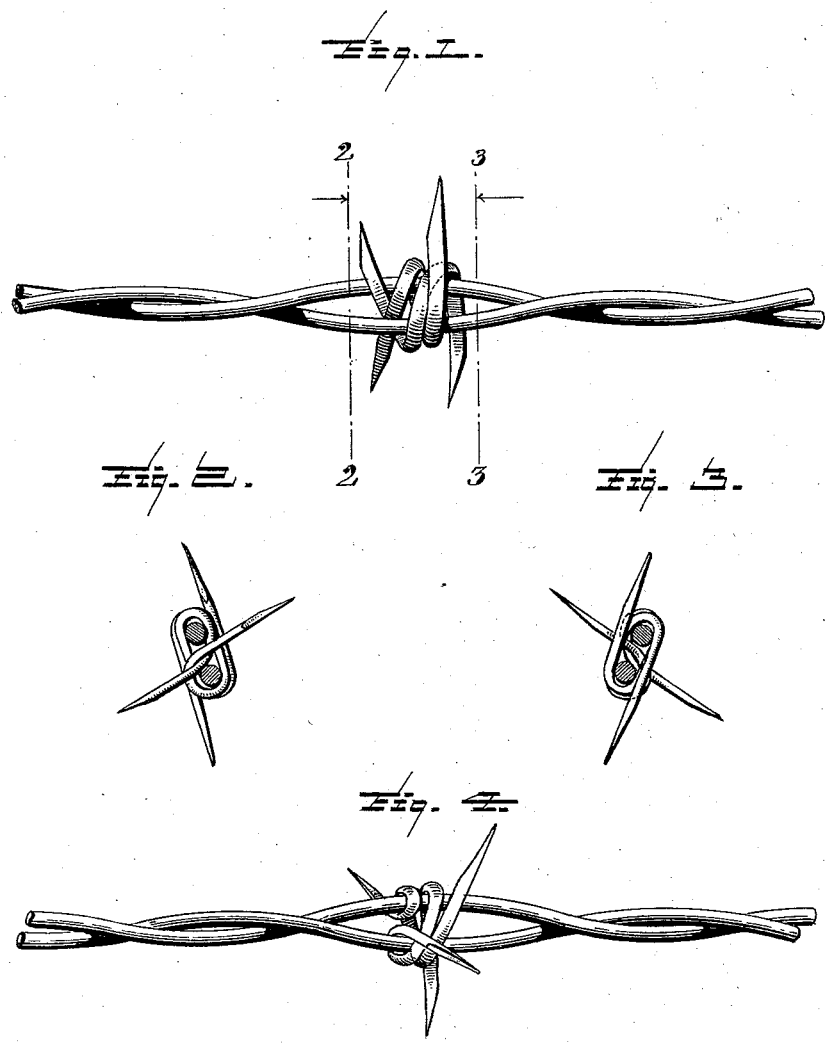
Witnesses
L. C. Hills
Evella Dick
Inventor
John D. Curtis
by Marcellus Bailey
his Attorney

UNITED STATES PATENT OFFICE.

JOHN D. CURTIS, OF WORCESTER, MASSACHUSETTS.

BARBED WIRE.

SPECIFICATION forming part of Letters Patent No. 494,326, dated March 28, 1893.

Application filed November 2, 1892. Serial No. 450,796. (No model.)

*To all whom it may concern:*

Be it known that I, JOHN D. CURTIS, a citizen of the United States, residing at Worcester, in the county of Worcester and Commonwealth of Massachusetts, have invented certain new and useful Improvements in Barbed Wire; and I do hereby declare that the following is a full, clear, and exact description thereof, which, in connection with the drawings making a part of this specification, will enable others skilled in the art to which my invention belongs to make and use the same.

My invention relates to four-point barbed wire, and particularly to that style of four-point barbed wire in which the two wires forming the barb are thrust between and wrapped around both strands of the fencing, as distinguished from that style of barbed wire in which the barb is wrapped around one of the two strands of the fencing.

The object of my invention is to improve upon this style of barbed wire by constructing a barb which shall be more firmly locked in position, which shall be lighter in weight and more compact in appearance than any barb of this style heretofore made, and which shall be so formed as to reduce the distance between the two main strands of the fencing to a minimum thus permitting the use of shorter lengths of wire to form the barbs, insuring a more uniform twist in the main strands of the fencing. This I accomplish by using to form the barb, wires half round in cross section, or non-circular in cross section but having one side flat, the barb forming wires being so applied that their flat sides shall be next both to the two strands of the fence wire around which they pass and to the individual single strands which they encircle at their ends which are inserted between the fence wires.

In the accompanying drawings—Figure 1 is a view of a piece of double strand wire provided with my improved four-point barb. Fig. 2 is a cross section on line 2—2, Fig. 1. Fig. 3 is a cross section on line 3—3, Fig. 1. Fig. 4 is a view of a modification.

It is clear that the interests of users of barbed wire demand that it should be made as light as possible, thus decreasing the cost. The most obvious way in which to decrease the cost of the fence would be to use smaller wires for the main strands, but these cannot be unduly decreased in size as it is always necessary to have these wires large enough to withstand the very considerable strain which is brought to bear upon them; consequently the weight of the barb becomes a matter of great importance and hence it has always been the endeavor of manufacturers to produce as light a barb as possible, while making it sufficiently strong to repel animals, and at the same time compact, and firmly locked in position, so that in transportation, and when in use, the barbs will not be bent out of shape. The use of this very desirable style of four-point barbed wire is becoming more and more restricted for several reasons. Heretofore, barbs of this style have been made of round wire and in consequence the fencing is heavier than other styles of barbed wire. Furthermore, the bearing surfaces of the barb made from round wires, upon the main wires are so narrow that the two parts of the barb are not firmly locked in place, and consequently the barbs are loosely and not rigidly attached to the fence wires. Furthermore by reason of the size and shape of the round barb wires the main strands of the fencing have been necessarily held so far apart that it has been difficult to secure a uniform twist or a barb, compact in construction and appearance. It would clearly be a great advantage if these various and serious defects in this style of barbed wire could be remedied, for it is a most useful form of fencing, each barb presenting four repelling points and inclosing both strands of the cable.

In my improved barbed wire I use for the barbs, wires having one flat side, or preferably a half-round or flat wire. The barb is attached to the fence wires A, B, by thrusting the two wires *a, b*, of which it is composed, between the strands of the fencing, from opposite directions, with their flat sides in contact with the strands of the fencing, and coiling the loose ends of the barb wire one or more times about the fence strands, leaving them parallel with each other, and substantially at right angles with the other two ends of the barb wires, the barb wires being so placed and wrapped that their flat sides are in contact or next to the fence strands which they encircle. In the arrangement shown in Figs. 1—3 the ends of the barb wires which are inserted between the strands cross each other, and are so placed that where they cross their flat sides are in contact.

In the modification shown in Fig. 4 the wrapping of the barb wires is substantially the same as in Fig. 1, save that the inserted ends while encircling, as in the other case, each an individual fence wire, do not cross each other. It will be seen that in using half round or flat wires for the barbs I reduce the weight of the barb at least one-half, and at the same time produce a barb more firmly locked in position upon the main strands by reason of the broad bearing surface of the flat contact sides of the barb wires with the main wires of the fencing, and also a barb much more compact in form and appearance, permitting the main wires of the cable to come more nearly in contact and avoiding the awkward loop at the point where the barb is attached, so noticeable and objectionable in this form of barb, as heretofore made.

In using my improved barb instead of the old style, in building a fence of four strands a mile long, I make a saving of two hundred and sixty four pounds, or over fifteen per cent.

I am aware of Patent No. 232,372, of September 21, 1880, in which one of the barb wires, (both of which are round) having an eye in its middle, is laid crosswise between the two fence strands, and the second barb wire is threaded through the eye of the first, and is then wrapped on or around the fence strands; also of Patent No. 281,300, of July 17, 1883, in which each of the two round barb wires is wrapped once around one strand only, and the meeting ends of the two wires are inserted through between the wires crossing each other and then bent or twisted together at the crossing points. I make no claim to anything shown and described in these patents.

Having thus described my invention, what I claim as new, and desire to secure by Letters Patent, is—

1. The combination with a double strand fence wire of a four point barb, formed of wires non-circular in cross section, each of which is wrapped around both strands with its flat side next to the said strands, and is inserted at one end between them, in the manner hereinbefore shown and set forth.

2. The combination with a double strand fencing of a four-point barb made from two half-round or flat wires inserted between and wrapped around the main wires so as to cross each other between the main wires and bring the flat surfaces of the barb in contact with the strands of the fence and with each other, thereby giving the barb a broad bearing and locking the two parts of the barb firmly in position, substantially as shown and described.

JOHN D. CURTIS.

Witnesses:
C. G. WASHBURN,
R. M. WASHBURN.